Figure 1:
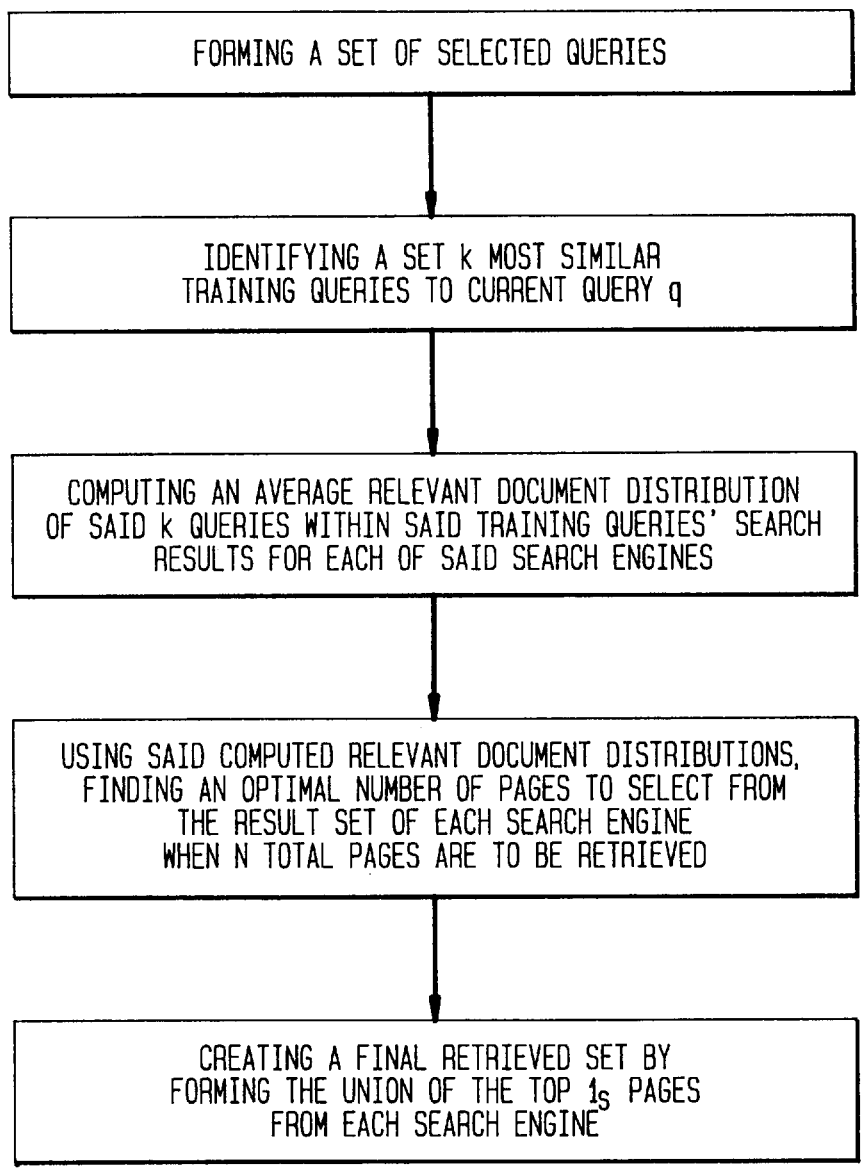

United States Patent [19]
Voorhees et al.

[11] Patent Number: 5,864,846
[45] Date of Patent: Jan. 26, 1999

[54] METHOD FOR FACILITATING WORLD WIDE WEB SEARCHES UTILIZING A DOCUMENT DISTRIBUTION FUSION STRATEGY

[75] Inventors: Ellen M. Voorhees, North Potomac, Md.; Narendra K. Gupta, Dayton, N.J.

[73] Assignee: Siemens Corporate Research, Inc., Princeton, N.J.

[21] Appl. No.: 674,646

[22] Filed: Jun. 28, 1996

[51] Int. Cl.[6] .................................................. G06F 17/30
[52] U.S. Cl. ............................ 707/5; 707/2; 707/3; 707/4
[58] Field of Search .................................. 707/3, 5, 2, 4

[56] References Cited

U.S. PATENT DOCUMENTS

| | | | |
|---|---|---|---|
| 4,823,306 | 4/1989 | Barbic et al. | 707/6 |
| 5,404,514 | 4/1995 | Kageneck et al. | 707/5 |
| 5,442,778 | 8/1995 | Pedersen et al. | 707/5 |
| 5,576,954 | 11/1996 | Driscoll | 707/3 |
| 5,642,502 | 6/1997 | Driscoll | 707/5 |
| 5,659,732 | 8/1997 | Kirsch | 707/5 |
| 5,675,819 | 10/1997 | Schuetze | 1/1 |
| 5,706,497 | 1/1998 | Takahashi et al. | 707/5 |

OTHER PUBLICATIONS

Bartell et al., "Automatic Combination of Multiple Ranked Retrieval Systems", Proceedings of SIGIR '94, Jul. 1994, pp. 173–181.
Belkin et al., "The Effect of Multiple Query Representations on Information System Performance", Proceedings of SIGIR '93, Jun. 1993, pp. 339–346.
Fox et al., "Combination of Multiple Searches", Proceedings of TREC–3, Apr. 1995, pp. 105–108.
Steinberg, "Seek and Ye Shall Find (Maybe)" Wired, vol. 4, #5, May 1996, pp. 1–18.
QuarterDeck, URL: http://arachnid.qdeck.com/qdeck/products/webcompass.
Towell et al., "Learning Collection Fusion Strategies for Information Retrieval", Proceedings of the 12th Annual Machine Learning Conference, Jul. 1995, pp. 540–548.
Voorhees et al., "The Collection Fusion Problem", Proceedings of TREC–3, NIST Special Publication 500–225, Apr. 1995, pp. 95–104.
Voorhees et al., "Learning Collection Fusion Strategies", Proceedings of SIGIR '95, Jul. 1995, pp. 172–179.

*Primary Examiner*—Paul R. Lintz
*Attorney, Agent, or Firm*—Adel A. Ahmed

[57] ABSTRACT

A computer-implemented method for facilitating World Wide Web Searches and like database searches by combining search result documents, as provided by separate search engines in response to a query, into one single integrated list so as to produce a single document with a ranked list of pages, by forming a set of selected queries, the queries including respective terms, for which selected queries relevance data from past data is known, herein referred to as training queries, in a vector space comprising all training queries, the relevance data comprising judgments by a user as to whether a page is appropriate for a query which retrieved it. Further steps in the method are identifying a set of k most similar training queries to current query q, computing an average relevant document distribution of the k queries within the training queries' search results for each of the search engines, using the computed relevant document distributions, finding an optimal number of pages to select from the result set of each search engine when N total pages are to be retrieved, and creating a final retrieved set by forming the union of the top $\lambda_s$ pages from each search engine.

15 Claims, 2 Drawing Sheets

METHOD FOR FACILITATING WORLD WIDE WEB SEARCHES UTILIZING A DOCUMENT DISTRIBUTION FUSION STRATEGY

The present invention relates to an automatic method for facilitating World Wide Web Searches and, more specifically, to an automatic method for facilitating World Wide Web Searches by exploiting the differences in the search results of multiple search engines to produce a single list that is more accurate than any of the individual lists from which it is built.

Text retrieval systems accept a statement of information need in the form of a query, assign retrieval status values to documents in the collection based on how well the documents match the query, and return a ranked list of the documents ordered by retrieval status value. Data fusion methods that combine the search results of different queries representing a single information need to produce a final ranking that is more effective than the component rankings are well-known. See Bartell, B. T., Cottrell, G. W., and Belew, R. K.: Automatic combination of multiple ranked retrieval systems; Proceedings of SIGIR-94; July, 1994. Belkin, N. J. et al.: The effect of multiple query representations on information system performance; Proceedings of SIGIR-93; June, 1993. Fox, E. A. and Shaw, J. A. Combination of multiple searches. Proceedings of TREC-2; March, 1994.

However, these fusion methods determine the rank of a document in the final list by computing a function of the retrieval status values of that document in each of the component searches. The methods are therefore not applicable when the component searches return only the ordered list of documents and not the individual status values.

The World Wide Web is a collection of information-bearing units called "pages" interconnected by a set of links. To help users find pages on topics that are of interest to them, several groups provide search engines that accept a statement of user need (in either English or a more formal query language) and return a list of pages that match the query. A list is usually ordered by a similarity measure computed between the query and the pages. While each of the search engines in principle searches over the same set of pages (the entire Web), the size of the Web and the imprecise nature of the search algorithms frequently causes different search engines to return different lists of pages for the same query.

Search engines such as Excite and Alta Vista provide a query interface to the information in these pages, and, like traditional text retrieval systems, return a ranked list of pages ordered by the similarity of the page to the query. See Steinberg, Steve G.: Seek and Ye Shall Find (Maybe); Wired; May, 1996. Because the search engines process queries in different ways, and because their coverage of the Web differs, the same query statement given to different engines often produces different results. Submitting the same query to multiple search engines, for example such as Quarterdeck's WebCompass product does, can improve overall search effectiveness. See QuarterDeck. URL: http://arachnid.qdeck.com/qdeck/products/webcompass.

In accordance with an aspect of the invention, a method provides for combining the results of the separate search engines into a single integrated ranked list of pages in response to a query. Unlike WebCompass, the method does not keep the search results separated by the search engine that produced the result, but forms a single ranked list. Unlike the traditional fusion methods, the method in accordance with the invention can produce a single ranking despite the fact that most search engines do not return the similarities that are computed for individual pages.

The method in accordance with the invention utilizes a particular application of algorithms developed to combine the results of searches on potentially disjoint databases. See Towell, G., et al.: Learning Collection Fusion Strategies for Information Retrieval; Proceedings of the 12th Annual Machine Learning Conference; July, 1995. Voorhees, E. M., Gupta, N. K., and Johnson-Laird, B.: The Collection Fusion Problem; Proceedings of TREC-3, NIST Special Publication 500-225; April, 1995; pp. 95-104. Voorhees, E. M., Gupta, N. K., and Johnson-Laird, B.: Learning Collection Fusion Strategies; Proceedings of SIGIR-95; July, 1995; pp. 172-179.

In accordance with another aspect of the invention, a computer-implemented method for facilitating World Wide Web Searches by combining search result documents, as provided by separate search engines in response to a query, into one single integrated list so as to produce a single document with a ranked list of pages, the method comprises the steps of (a) forming a set of selected queries, the queries including respective terms, for which selected queries relevance data from past data is known, herein referred to as training queries, in a vector space comprising all training queries, the relevance data comprising judgments by a user as to whether a page is appropriate for a query which retrieved it; (b) identifying a set of k most similar training queries to current query q; (c) computing an average relevant document distribution of the k queries within the training queries' search results for each of the search engines; (d) using the computed relevant document distributions, finding an optimal number of pages to select from the result set of each search engine then N total pages are to be retrieved; and (e) creating a final retrieved set by forming the union of the top $\lambda_s$ pages from each search engine.

An object of the present invention is to approximate the effectiveness of a single text retrieval system despite the collection being physically separated. Another object of the present invention is to combine the results of multiple searches of essentially the same database so as to improve the performance over any single search.

In accordance with another aspect of the invention, the present method for facilitating World Wide Web searches utilizing a query clustering fusion strategy uses relevance data - - - judgments by the user as to whether a page is appropriate for the query which retrieved it - - - from past queries to compute the number of pages to select from each search engine for the current query. In the present description, the set of queries for which relevance data is known is called the training queries. The terms "page" and "document" are used interchangeably.

Figure 2:
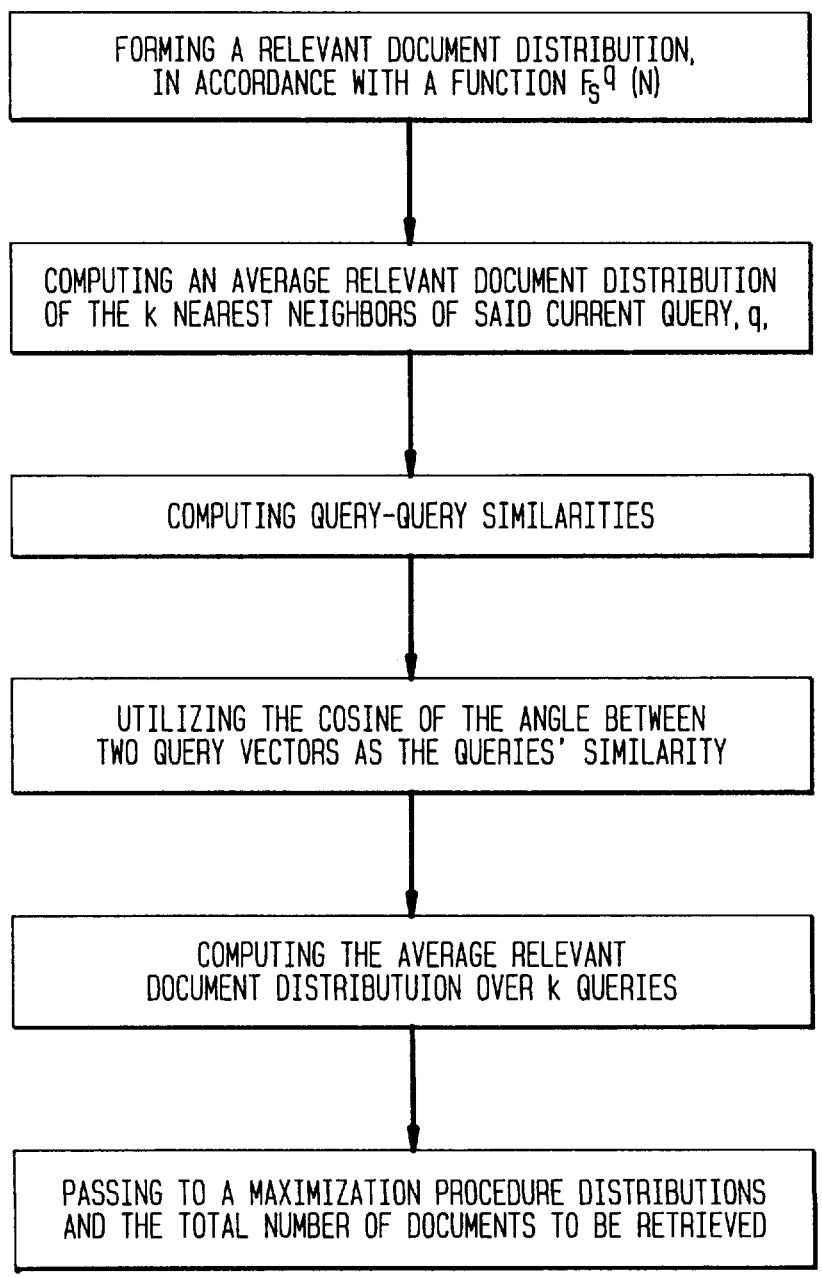

FIGS. 1 and 2 show flow charts helpful to a fuller understanding of the invention.

The function $F_s^q$ (N), called a relevant document distribution, returns the number of relevant pages retrieved by search engine s for query q in the ranked list of size N. The fusion method in accordance with the present invention, builds an explicit model of the relevant document distribution of the joint search. The model is created by computing the average relevant document distribution of the k nearest neighbors of the current query, q. The nearest neighbors of q are the training queries that have the highest similarity with q.

To compute query-query similarities, the present invention utilizes a vector representation of the queries. The vector queries are created by removing a set of high-frequency function words such as prepositions from the query text, stemming the remaining words (i.e., removing suffixes to conflate related words to a common root), and assigning a weight to each term equal to the number of times the term occurs in the text (term frequency weights). The cosine of the angle between two query vectors is used as the queries' similarity.

The average relevant document distribution over k queries is computed by taking the average of the number of relevant documents retrieved by the set of queries after each document retrieved. Once the average relevant document distribution is computed for the current query for each search engine, the distributions and the total number of documents to be retrieved are passed to a maximization procedure. This procedure finds the cut-off level for each search engine that maximizes the number of relevant documents retrieved (the current maximization procedure simply does an exhaustive search). The computed cut-off levels are the number of documents selected from the result set of each search engine. The steps of the fusion process in accordance with the invention are essentially as follows.

A. Find the k most similar training queries to current query q
1. Using standard techniques, create query vectors in a vector space consisting of all training queries. Weight terms in queries using a function that is proportional to the number of times the term occurs in the query.
2. Create a query vector for the current query in the same vector space. Compute a vector similarity measure between the current query and all training queries.
3. Select the k training queries with the highest similarities.

B. Within the training queries' search results for each search engine, compute the average relevant document distribution of the k queries.
1. A relevant document distribution for a query q gives for each rank r the number of relevant documents retrieved at or below rank r by query q. The average distribution over a set of queries gives the mean number of relevant documents retrieved at or below rank r over the query set.

C. Using the computed relevant document distributions, find the optimal number of pages to select from the result set of each search engine when N total pages are to be retrieved.
1. Using any optimization technique (we use brute force), compute the number of pages that should be retrieved from each search engine ($\lambda_s$) such that the total number of pages retrieved is N and the maximum possible number of relevant pages is retrieved subject to the constraint that e.g., to retrieve the page at rank 5 from a collection pages at ranks 1—4 must also be retrieved.
2. There may be different combinations of pages retrieved from the search engine results that retrieve the maximum possible number of relevant pages. Choose any one of the combinations. Distribute "spill", the number of pages that can be retrieved from any search engine without affecting the number of relevant retrieved, in proportion to the number of pages that would otherwise be retrieved from that collection.

D. Create the final retrieved set by forming the union of the top $\lambda_s$ pages from each search engine.

1. Rank pages in the final retrieved set probabilistically using a biased c-faced die.
(a) To select the page to be in the next rank r of the final ranking, roll a c-faced die that is biased by the number of pages remaining to be placed in the final ranking from each of the search engines. Select the search engine whose number corresponds to the die roll and place the next page from that engine's ranking into the final ranking.
(b) Repeat until all N pages have been placed in the final ranking.

The parameter k is used to control the amount of generalization made from the training queries. Too few queries cause the predicted relevant document distribution to be too specific to the training queries, while too many queries cause different topic areas to be mixed resulting in too generic of a distribution.

As used herein, a roll of an unbiased c-faced die selects a number in the range from 1 to c with a uniform probability of 1/c; however, in order to produce the final ranking, it is desired to bias the probability of selecting a search engine, numbered from 1 to c, by the number of pages it has to place in the ranking. This means that the page place in the first rank will, with higher probability, be selected from the search engine that contributed the most pages to the retrieved set. As pages are placed in the final ranking, the search engine with the most pages remaining to be placed will change, and thus the specific probabilities of selecting a search engine also change.

A fusion method for facilitating World Wide Web Searches utilizing a query clustering fusion strategy is disclosed in a copending patent application by the present Inventor, entitled Method for facilitating World Wide Web Searches Utilizing a Query Clustering Fusion Strategy and filed on even date herewith and whereof the disclosure is herein incorporated by reference to the extent it is not incompatible with the present invention. As therein disclosed, the fusion method does not attempt to form an explicit model of a search engine's relevant document distribution.

Instead, that system learns a measure of the quality of a search for a particular topic area by that engine. The number of pages selected from an engine for a new query is proportional to the value of the quality measure computed for that query. As in the approach disclosed in the above-referenced application, the fusion strategy in accordance with the invention uses query vectors. Topic areas are represented as centroids of query clusters. For each search engine, the set of training queries is clustered using the number of (relevant and irrelevant) documents retrieved in common between two queries as a similarity measure. The assumption is that if two queries retrieve many documents in common they are about the same topic. The centroid of a query cluster is created by averaging the vectors of the queries contained within the cluster. This centroid is the system's representation of the topic covered by that query cluster.

The training phase also assigns to a cluster a weight that reflects how effective queries in the cluster are for that search engine - - - the larger the weight, the more effective the queries are believed to be. The average number of relevant pages retrieved by queries in the cluster is used as a cluster's weight.

After training, queries are processed as follows. The cluster whose centroid vector is most similar to the query vector is selected for the query and the associated weight is returned. The set of weights returned over all the search engines is used to apportion the final retrieved set such that when N pages are to be returned and $w_s$ is the weight returned by engine s, $(w_s/\Sigma w_k)*N$ (rounded appropriately) documents are selected from engine s. For example, assume the total number of pages to be retrieved is 100, and there are five search engines.

If the weights returned by the engines are 4, 3, 3, 0, 2, then the first 33 pages returned by engine 1 would be selected, the first 25 pages from each of engines 2 and 3 would be selected, no pages would be selected from engine 4, and the first 17 pages from engine 5 would be selected. However, if the weights returned were 4, 8, 4, 0, 0 then 25 pages would be selected from each of engines 1 and 3, and 50 pages would be selected from engine 2. The weight of a cluster for a single engine in isolation is not meaningful; it is the relative difference in weights returned by the set of search engines over which the fusion is to be performed that is important. Of course, many variations of this scheme, such as forcing small weights to zero when the difference between weights is very large, are also possible.

The current implementation uses the Ward clustering method and the reciprocal of the number of documents retrieved in common in the top 100 pages as the distance metric to cluster the training queries. A single set of clusters is produced from the resultant dendogram by cutting the dendogram at a pre-determined distance. The weight assigned to each cluster is the average number of relevant documents in the top L ranks. The similarity between a cluster centroid and a query is computed as the cosine of the two vectors, where each vector uses term frequency weights.

In the query clustering fusion strategy, the parameter L controls part of the generalization made from the training queries. The number of documents used to compute query-query similarities for the clustering routine will also have an effect. Steps of the method disclosed in the above-referenced copending patent application can be summarized as follows.

A. Train for each search engine:
 1. Cluster training queries and build cluster centroids.
    (a) Apply Ward's clustering algorithm, using the number of pages retrieved in common at a rank less than or equal to a parameter L as the similarity between two queries.
    (b) Form clusters from hierarchy by considering all queries that cluster above a certain threshold to belong to the same cluster.
    (c) Form centroid for a particular cluster by creating the mean vector over all query vectors in the cluster.
       i. Create query vectors from query text using standard vector processing techniques; weight the terms using a function that is proportional to the number of times the term occurs in the query.
       ii. The weight of a term in the centroid vector is the sum of its weights in the vectors of the queries in the cluster divided by the number of queries in the cluster.
 2. Assign weights to each cluster reflecting the number of relevant pages expected to be obtained by this search engine for queries similar to those in the cluster.
    (a) Compute a cluster's weight as the mean number of relevant pages retrieved at a rank less than or equal to a parameter L over all the queries in the cluster.
B. To process an incoming query, for each search engine,
 1. Find the cluster centroid that is most similar to the query.
    (a) Create a query vector for the current query in the vector space of the training queries.
    (b) Compute a vector similarity measure (e.g., the cosine) between the current query vector and each of the centroids.
    (c) Choose the centroid that has the greatest similarity.
 2. Return the weight associated with the selected cluster as the weight of the current search engine.
C. Apportion the N slots in the retrieved set according to the weights returned by each search engine.
 1. Sum the weights returned by the set of engines.
 2. Select the top weight-of-this-engine/sum (rounded down) pages from the retrieved set of each engine.
 3. When fewer then N pages are retrieved due to rounding, select 1 more page from the most highly weighted engines until N pages are retrieved. (Break ties arbitrarily.)
 4. Rank pages in the retrieved set probabilistically using a biased c-faced die.
    (a) To select the document to be in the next rank r of the final ranking, roll a c-faced die that is biased by the number of pages remaining to be placed in the final ranking from each of the engines. Select the engine whose number corresponds to the die roll and place the next page from that engine's ranking into the final ranking.
    (b) Repeat until all N pages have been placed in the final ranking.

The invention has been described by way of an exemplary embodiment. Various changes and modifications will be apparent to one skilled in the art to which it pertains. While reference has been made to the World Wide Web in conjunction with searches, it is intended and should be understood that what is herein intended is a data base as represented by the World Wide Web, of that type and not necessarily so named. Such changes and modifications are intended to be within the spirit and scope of the invention which is defined by the claims following.

We claim:

1. A computer-implemented method for facilitating World Wide Web Searches and like searches by combining search result documents, as provided by separate search engines in response to a query, into one single integrated list so as to produce a ranked list of pages, said method comprising the steps of:

(a) forming a set of selected queries, said queries including respective terms, for which selected queries relevance data from past data is known, herein referred to as training queries, in a vector space comprising all training queries, said relevance data comprising judgments by a user as to whether a page is appropriate for a query which retrieved it;

(b) identifying a set of k most similar training queries to current query q;

(c) computing an average relevant document distribution of said k queries within said training queries' search results for each of said search engines;

(d) using said computed relevant document distributions, finding an optimal number of pages to select from the result set of each search engine when N total pages are to be retrieved; and (e) creating a final retrieved set by forming the union of the top $\lambda_s$ pages from each search engine.

2. A computer-implemented method in accordance with claim 1, wherein step (a) comprises a step of (A) weighting each given term in said selected queries using a function that is proportional to that number of times said given term occurs in the query.

3. A computer-implemented method in accordance with claim 2, wherein step (a) comprises:

(B) creating a query vector for a current query in said vector space; and (C) computing a vector similarity measure between said current query and all training queries.

4. A computer-implemented method in accordance with claim 1, wherein step (a) comprises (C) selecting those k training queries with the highest similarities.

5. A computer-implemented method in accordance with claim 1, wherein in step (c), said average relevant document distribution is such that a relevant document distribution for a query q gives for each rank r the number of relevant documents retrieved at or below rank r by query q and the average distribution over a set of queries gives the mean number of relevant documents retrieved at or below rank r over the query set.

6. A computer-implemented method in accordance with claim 1, wherein step (d) comprises:

(D) computing, by using a selected optimization technique, a number of pages that should be retrieved from each respective search engine such that a total number of pages N is retrieved and a maximum possible number of relevant pages is retrieved subject to a predetermined constraint.

7. A computer-implemented method in accordance with claim 6, wherein said predetermined constraint is typified by a constraint such that to retrieve a page at rank R from a collection, pages at rank 1 through rank (R-1) must also be retrieved.

8. A computer-implemented method in accordance with claim 6, wherein, if in step (D) there be different combinations of pages retrieved from those search engine results that retrieve a maximum possible number of relevant pages, then select any one of said different combinations.

9. A computer-implemented method in accordance with claim 8, wherein step (A) comprises (E) distributing a number of pages that can be retrieved from any of said search engines without affecting the number of relevant documents retrieved, in proportion to that number of pages that would otherwise be retrieved from that collection.

10. A computer-implemented method in accordance with claim 9, wherein step (E) comprises ranking pages in said final retrieved set probabilistically in accordance with a rule of a die roll using a biased c-faced die.

11. A computer-implemented method in accordance with claim 10, wherein, to select the page to be in the next rank r of the final ranking, step (E) comprises rolling a c-faced die that is biased by the number of pages remaining to be placed in said final ranking from each of said search engines.

12. A computer-implemented method in accordance with claim 11, wherein step (A) comprises selecting that search engine whose number corresponds to said die roll; and placing the next page from that engine's ranking into said final ranking.

13. A computer-implemented method in accordance with claim 12, wherein the steps of claim 12 are repeated until all N pages have been placed in said final ranking.

14. A computer-implemented method for facilitating World Wide Web Searches and like searches by combining search result documents from a joint search, as provided by separate search engines in response to a query, into one single integrated list so as to produce a ranked list of pages, said method comprising the steps of:

(a) forming a relevant document distribution, in accordance with a function $F_s^q(N)$ which returns that number of relevant pages retrieved by search engine s for a current query q in a ranked list of size N;

(b) forming an explicit model of said relevant document distribution of said joint search by computing an average relevant document distribution of the k nearest neighbors of said current query, q, said nearest neighbors of q being those training queries that have highest similarity with q, said training queries being a set of selected queries, including respective terms, for which selected queries relevance data from past data is known, said relevance data comprising judgments by a user as to whether a page is appropriate for a query which retrieved it;

(c) computing query-query similarities, by generating a vector query representation of said queries wherein vector queries are created by removing a set of high-frequency function words, such as prepositions from query text, stemming remaining words, that is, removing suffixes to conflate related words to a common root, and assigning a term frequency weight to each term equal to the number of times the term occurs in said text;

(d) utilizing the cosine of the angle between two query vectors as the queries' similarity;

(e) computing the average relevant document distribution over k queries by taking an average of that number of relevant documents retrieved by the set of queries after each document retrieved; and (f) passing to a maximization procedure distributions and the total number of documents to be retrieved once the average relevant document distribution is computed for the current query for each search engine, for finding the cut-off level for each search engine that maximizes the number of relevant documents retrieved, whereby said computed cut-off levels correspond to the number of documents selected from the result set of each search engine.

15. A computer-implemented method for facilitating World Wide Web Searches and like searches by combining search result documents, as provided by separate search engines in response to a query, into one single integrated list so as to produce a ranked list of pages, said method comprising the steps of:

forming a set of selected queries, said queries including respective terms, for which selected queries relevance data from past data is known, herein referred to as training queries, in a vector space comprising all training queries, said relevance data comprising judgments by a user as to whether a page is appropriate for a query which retrieved it, said forming a set of selected queries including weighting each given term in said selected queries using a function that is proportional to that number of times said given term occurs in the query, creating a query vector for a current query in said vector space, computing a vector similarity measure between said current query and all training queries, selecting those k training queries with the highest similarities, identifying a set of k most similar training queries to current query q, computing an average relevant document distribution of said k queries within said training queries' search results for each of said search engines, wherein said average relevant document distribution is such that a relevant document distribution for a query q gives for each rank r the number of relevant documents retrieved at or below rank r by query q and the average distribution over a set of queries gives the mean number of relevant documents retrieved at or below rank r over the query set, using said computed relevant document distributions, finding an optimal number of pages to select from the result set of each search engine when N total pages are to be retrieved, computing, by using a selected optimization technique, a number of pages that should be retrieved from each respective search engine such that a total number of pages N is retrieved and a maximum possible number of relevant pages is retrieved subject to a predetermined constraint, said predetermined constraint is typified by a constraint such that to retrieve a page at rank R from a collection, pages at rank 1 through rank (R-1) must also be retrieved, wherein, if in step (D) there be different combinations of pages retrieved from those search engine results that retrieve a maximum possible number of relevant pages, then select any one of said different combinations, distributing a number of pages that can be retrieved from any of said search engines without affecting the number of relevant documents retrieved, in proportion to that number of pages that would otherwise be retrieved from that collection, creating a final retrieved set by forming the union of the top $\lambda_s$ pages from each search engine, ranking pages in said final retrieved set probabilistically in accordance with a rule of a die roll using a biased c-faced die, wherein, to select the page to be in the next rank r of the final ranking, rolling a c-faced die that is biased by the number of pages remaining to be placed in said final ranking from each of said search engines, selecting that search engine whose number corresponds to said die roll; and placing the next page from that engine's ranking into said final ranking, and repeating said steps of selecting that search engine whose number corresponds to said die roll and placing the next page from that engine's ranking into said final ranking are repeated until all N pages have been placed in said final ranking.

* * * * *